(12) United States Patent
Wu

(10) Patent No.: US 10,695,842 B2
(45) Date of Patent: Jun. 30, 2020

(54) HORIZONTAL LATHE MACHINE WITH A MID-SPINDLE AND TWO TOOLING TURRETS

(71) Applicant: Hsuan-Lung Wu, Taichung (TW)

(72) Inventor: Hsuan-Lung Wu, Taichung (TW)

( * ) Notice: Subject to any disclaimer, the term of this patent is extended or adjusted under 35 U.S.C. 154(b) by 0 days.

(21) Appl. No.: 16/103,172

(22) Filed: Aug. 14, 2018

(65) Prior Publication Data

US 2020/0055123 A1    Feb. 20, 2020

(51) Int. Cl.
  *B23B 3/16*   (2006.01)
  *B23B 29/28*  (2006.01)
  *B23Q 3/12*   (2006.01)

(52) U.S. Cl.
  CPC ........... *B23B 29/287* (2013.01); *B23Q 3/12* (2013.01); *B23B 3/167* (2013.01)

(58) Field of Classification Search
  CPC ....... B23B 29/287; B23B 3/165; B23B 3/168; B23B 3/16; B23B 3/164; Y10T 82/2506; Y10T 82/2508; Y10T 82/2568; Y10T 82/2597; Y10T 82/27; B23Q 39/026; B23Q 39/027
  See application file for complete search history.

(56) References Cited

U.S. PATENT DOCUMENTS

| | | | | |
|---|---|---|---|---|
| 4,064,774 A | * | 12/1977 | Maddock | B23B 3/06 82/170 |
| 5,395,297 A | * | 3/1995 | Takada | B23Q 3/15526 483/25 |
| 6,173,630 B1 | * | 1/2001 | Wu | B23B 3/06 82/129 |
| 8,464,618 B2 | * | 6/2013 | Kanaya | B23B 7/04 82/1.11 |
| 2007/0068350 A1 | * | 3/2007 | Kawasumi | B23B 3/167 82/121 |
| 2007/0084319 A1 | * | 4/2007 | Ueda | B23B 3/167 82/129 |
| 2010/0083800 A1 | * | 4/2010 | Kanaya | B23B 7/04 82/1.11 |
| 2014/0251097 A1 | * | 9/2014 | Walz | B23B 3/168 82/121 |
| 2014/0318331 A1 | * | 10/2014 | Walz | B23B 3/165 82/120 |

FOREIGN PATENT DOCUMENTS

| | | |
|---|---|---|
| TW | M536108 | 2/2017 |
| TW | M546866 | 8/2017 |

* cited by examiner

*Primary Examiner* — Nicole N Ramos
(74) *Attorney, Agent, or Firm* — Burris Law, PLLC

(57) ABSTRACT

A horizontal lathe machine includes a work spindle unit disposed on a middle portion of a machine base and proximate to a front side of the machine base for holding a workpiece in an X-direction, and two tooling turret units located at two opposite sides of the spindle unit and driven to move in the X-direction by X-direction driving units. Each turret unit has a saddle movable on the machine base in the X-direction, and a turret driven by a turret driving member to rotate about a turret axis in a Y-direction that is perpendicular to the X-direction for facilitating a tool changing operation.

5 Claims, 6 Drawing Sheets

HORIZONTAL LATHE MACHINE WITH A MID-SPINDLE AND TWO TOOLING TURRETS

FIELD

The disclosure relates to a lathe machine, and more particularly to a horizontal lathe machine with a mid-spindle and two tooling turrets.

BACKGROUND

A conventional horizontal lathe machine with double spindles and double tooling turrets, such as that disclosed in Taiwanese Utility Model M536108, includes a movable work spindle seat movably mounted on a middle portion of a machine base, and first and second tool holding seats mounted at two opposite sides of the work spindle seat. Spindles of the first and second tool holding seats are disposed parallel to and face toward each other to respectively hold cutting tools for performing a machining process to a workpiece held by the work spindle seat. The work spindle seat has two opposite spindles on which cutting tools are mounted to cut an inner side of the workpiece.

Another conventional three-axis horizontal lathe machine as disclosed in Taiwanese Utility Model M546866 includes a work holding assembly mounted on a middle portion of a machine base, and two machining assemblies mounted at two opposite sides of the work holding assembly, and respectively having cutter changing mechanisms which define movable axes in line with each other.

Although the abovementioned horizontal lathe machines have two tooling turrets, in order for an operator to replace a cutting tool of each of the tooling turrets, each of the tooling turrets is required to be manually and rotatably driven to bring a cutting tool thereof in proximity to the front side of the machine base, i.e., in proximity of the operator for replacement, which can be time-consuming. In addition, during cutting machining operations, since the rotational direction of the turrets is oriented toward the operator, scraps from the workpiece may fly off therefrom, injuring the operator.

SUMMARY

Therefore, an object of the disclosure is to provide a horizontal lathe machine that can alleviate at least one of the drawbacks of the prior art.

According to the disclosure, the horizontal lathe machine includes a machine base, a work spindle unit, a pair of tooling turret units and a pair of X-direction driving units. The machine base has an upper surface and a pair of guide rails which are disposed on the upper surface and extend in an X-direction. The upper surface is bordered by a first side, a second side opposite to the first side in the X-direction, a front side, and a rear side opposite to the front side in a Y-direction that is perpendicular to the X-direction. The work spindle unit is disposed on the machine base and proximate to the front side, and has a mounting seat which is securely mounted on the machine base, a bi-directional spindle chuck which is rotatably mounted on the mounting seat about a spindle axis in the X-direction, and which has two collet ends opposite to each other along the spindle axis, and a chuck driving member which is disposed on the machine base to drive rotation of the bi-directional spindle chuck about the spindle axis. The tooling turret units are movably disposed on the machine base in the X-direction and respectively proximate to the first and second sides, and are located at two opposite sides of the work spindle unit in the X-direction. Each of the tooling turret units includes a saddle which movably rides on the guide rails, a turret which is rotatably mounted on the saddle about a turret axis in the Y-direction, and a turret driving member which is mounted on the saddle to drive rotation of the turret about the turret axis. Each of the X-direction driving units is located between the machine base and a respective one of the tooling turret units, and is disposed to drive a movement of the respective one of the tooling turret units in the X-direction relative to the machine base.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
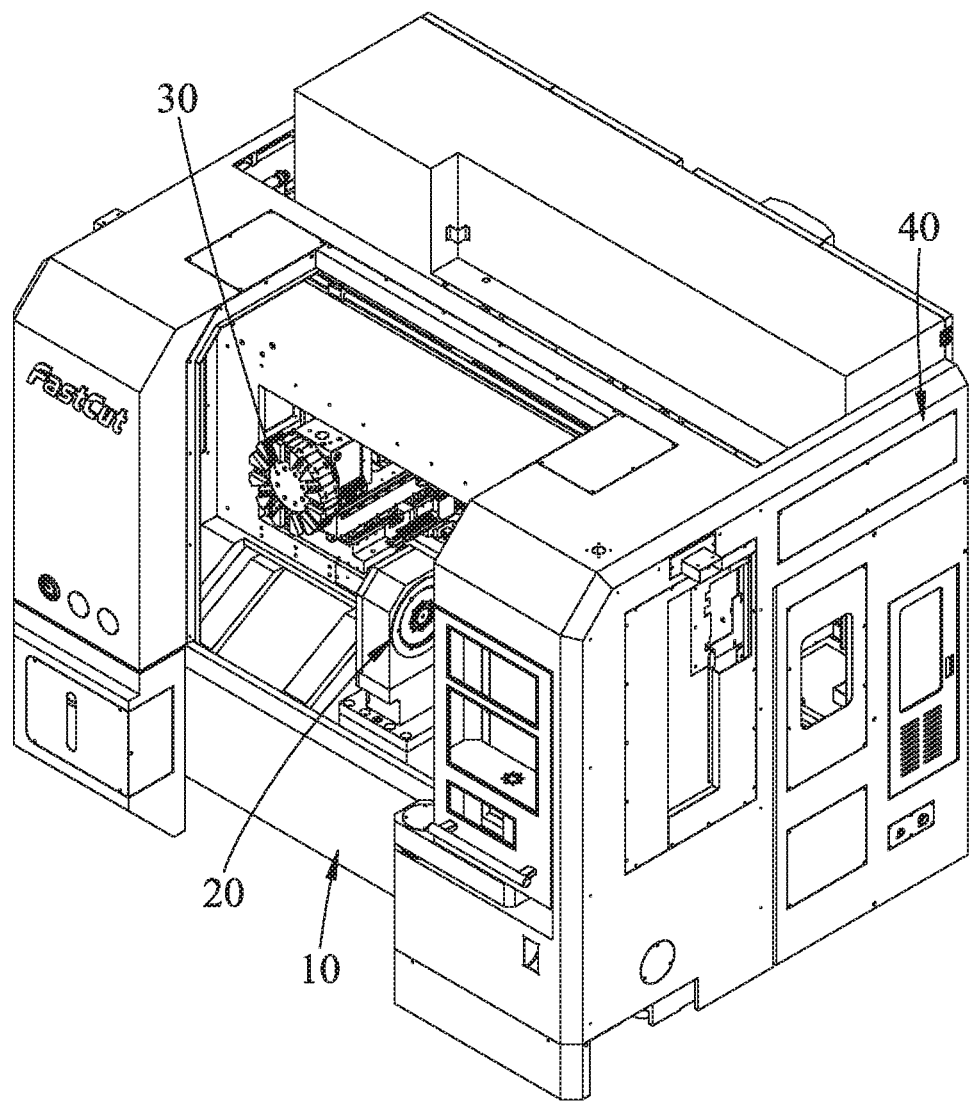
FIG. 1 is a perspective view illustrating an embodiment of a horizontal lathe machine according to the disclosure.
Figure 2:
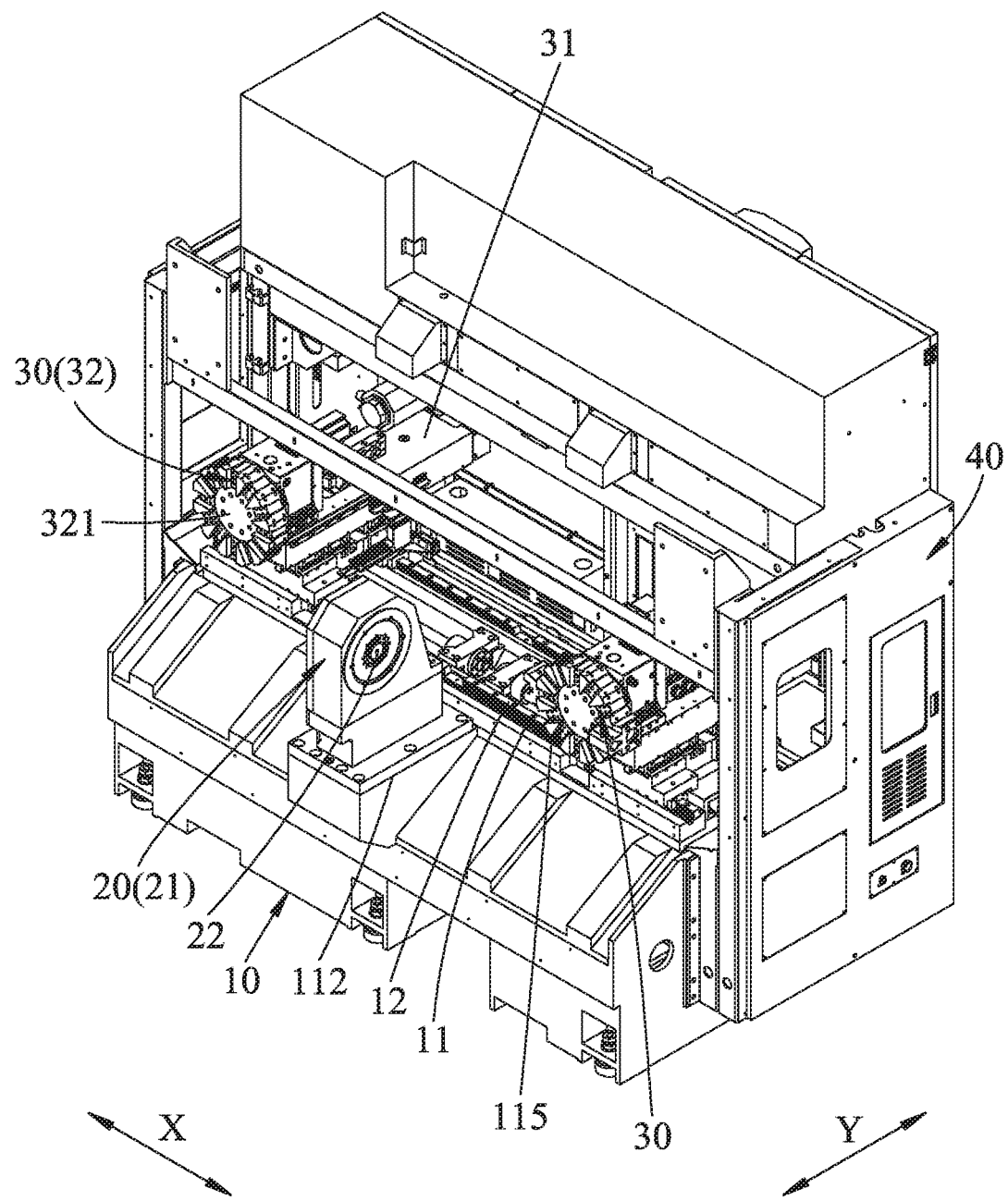
FIG. 2 is a perspective view of the embodiment, a portion of a protective cover unit being removed for sake of clarity.
Figure 5:
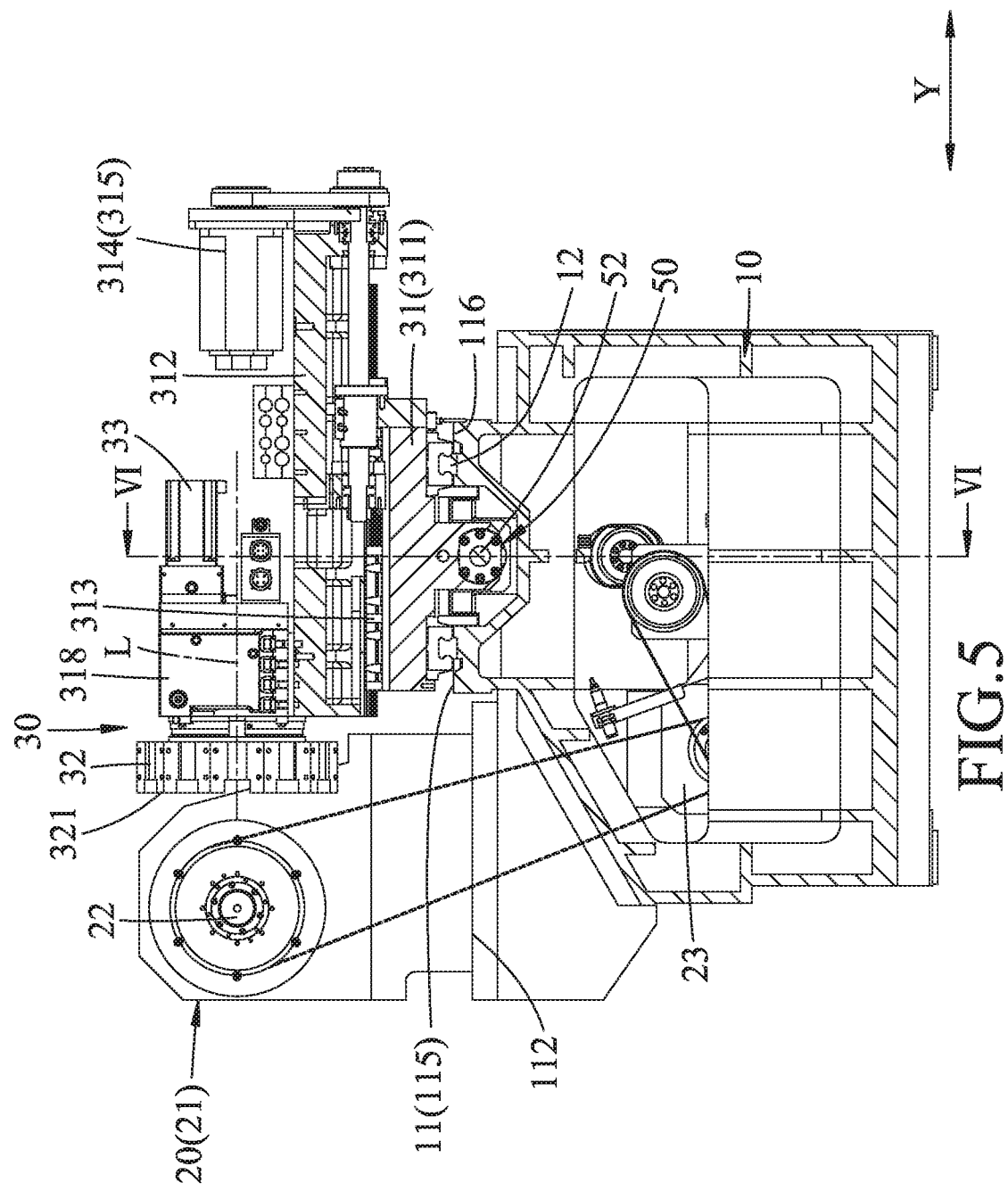
FIG. 5 is a sectional view taken along line V-V of FIG. 3.

Referring to FIGS. 1 and 2, an embodiment of a horizontal lathe machine according to the disclosure includes a machine base 10, a work spindle unit 20, a pair of tooling turret units 30, a protective cover unit 40 and a pair of X-direction driving units 50 (see FIG. 5).

Figure 3:
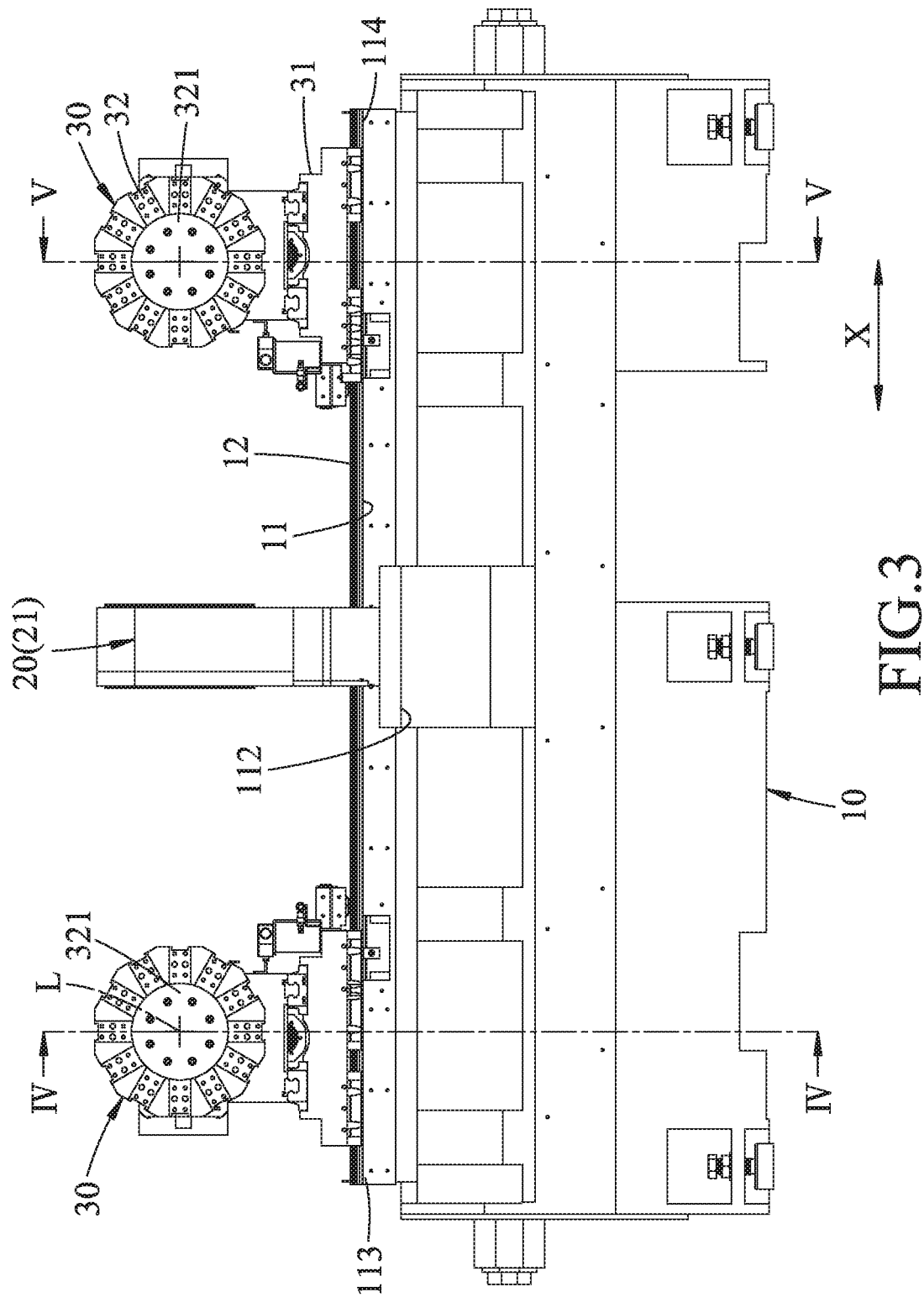
FIG. 3 is a schematic front view of the embodiment.
Figure 4:
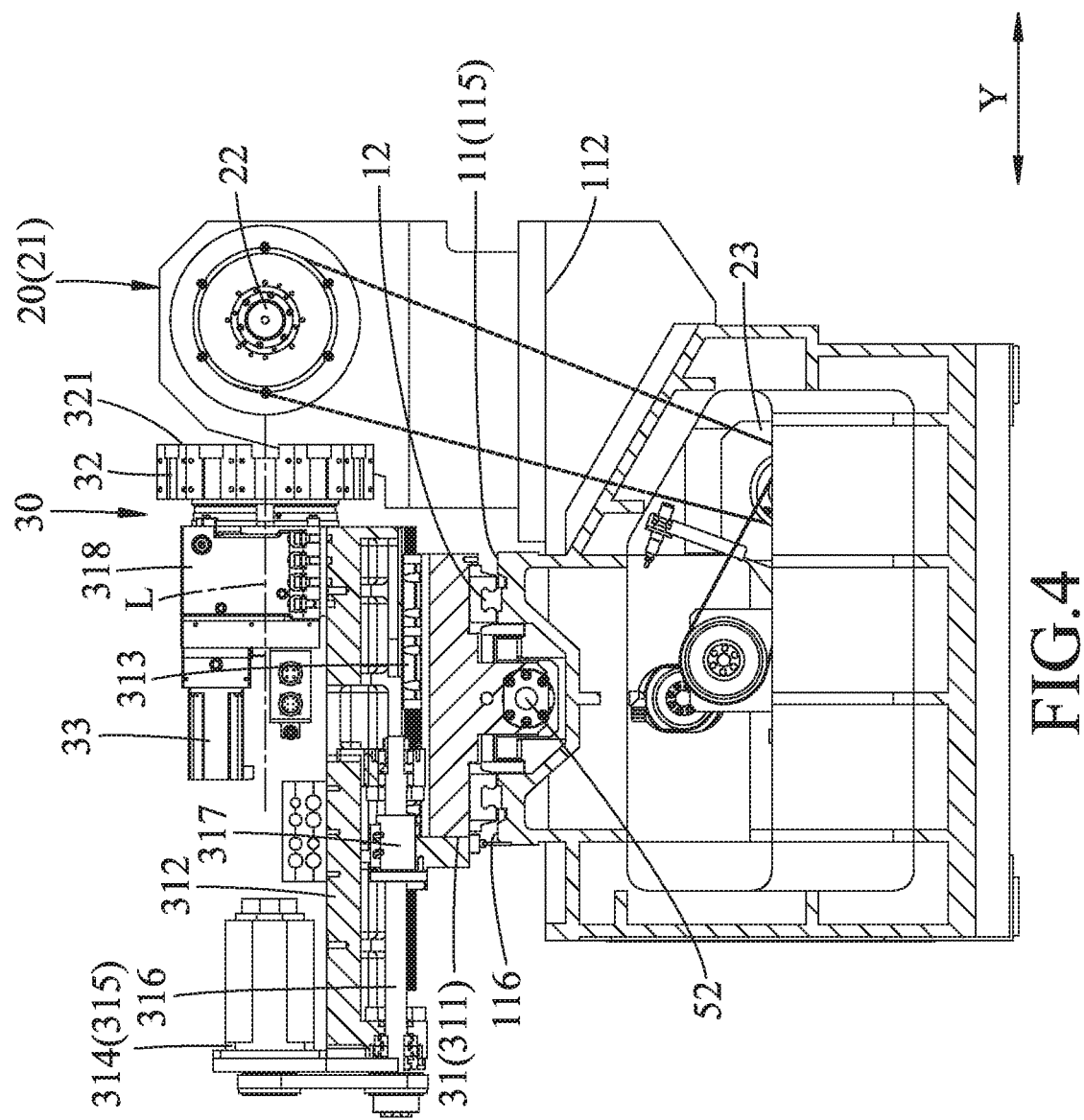
FIG. 4 is a sectional view take along line IV-IV of FIG. 3.

With reference to FIGS. 3 to 5, the machine base 10 has an upper surface 11, a pair of guide rails 12 which are disposed on the upper surface 11 and extend in an X-direction, and a front platform 112 which is disposed forwardly of the upper surface 11. The upper surface 11 is bordered by a first side 113, a second side 114 opposite to the first side 113 in the X-direction, a front side 115, and a rear side 116 opposite to the front side 115 in a Y-direction that is perpendicular to the X-direction. The front platform 112 is disposed forwardly of the front side 115 and at a middle portion of the upper surface 11.

The work spindle unit 20 is disposed on the front platform 112 of the machine base 10 and proximate to the front side 115, and has a mounting seat 21 which is securely mounted on the front platform 112, a bi-directional spindle chuck 22 which is rotatably mounted on the mounting seat 21 about a spindle axis in the X-direction, and which has two collet ends opposite to each other along the spindle axis, and a chuck driving member 23 which is disposed on the machine base 10 to drive rotation of the bi-directional spindle chuck 22 about the spindle axis. The bi-directional spindle chuck 22 can be used to hold, at the collet ends, two workpieces that extend opposite to each other along the spindle axis.

The tooling turret units 30 are movably disposed on the machine base 10 in the X-direction and respectively proximate to the first and second sides 113, 114, and are located at two opposite sides of the work spindle unit 20 in the X-direction, respectively. Each of the tooling turret units 30 includes a saddle 31 which movably rides on the guide rails 12, a turret 32 which is rotatably mounted on the saddle 31 about a turret axis (L) in the Y-direction, and a turret driving member 33 which is mounted on the saddle 31 to drive rotation of the turret 32 about the turret axis. The saddle 31 has a saddle base 311 slidably riding on the guide rails 12, a carriage 312 disposed on the saddle base 311, a linear slide rail 313 interposed between the saddle base 311 and the carriage 312 to permit a linear movement of the carriage 312 relative to the saddle base 311, and a Y-direction driving mechanism 314 disposed between the saddle base 311 and the carriage 312 to drive the linear movement of the carriage 312 in the Y-direction relative to the saddle base 311. The turret 32 is mounted on the carriage 312, and is rotatable relative to the carriage 312 about the turret axis (L). The turret 32 has an end surface 321 disposed normal to the turret axis (L) and facing forwardly, and can contain a plurality of cutting tools (not shown) angularly displaced from each other about the turret axis (L). The Y-direction driving mechanism 314 has a servomotor 315 mounted on the carriage 314, a threaded bolt 316 extending along a linear track in the Y-direction and driven by the servomotor 315 to rotate about the linear track, and a threaded nut 317 (see FIGS. 4 and 5) secured on an upper portion of the saddle base 311 and threadedly engaged with the threaded bolt 316 such that rotation of the threaded bolt 316 driven by the servomotor 315 results in a linear movement of the threaded bolt 316 and the carriage 312 along the linear track relative to the saddle base 311, and the linear movement of the turret 32 in the Y-direction relative to the work spindle unit 20 to carry out the cutter engaging and retracting operations. The carriage 312 has a mounting seat 318 on which the turret 32 is rotatably mounted and the turret driving member 33 is mounted. Specifically, the turrets 32 of the tooling turret units 30 are located between the bi-directional spindle chuck 22 and the rear side 116 in terms of the Y-direction.

Referring to FIGS. 1 and 2, the protective cover unit 40 is disposed to enclose the machine base 10, the work spindle unit 20 and the tooling turret units 30.

Figure 6:
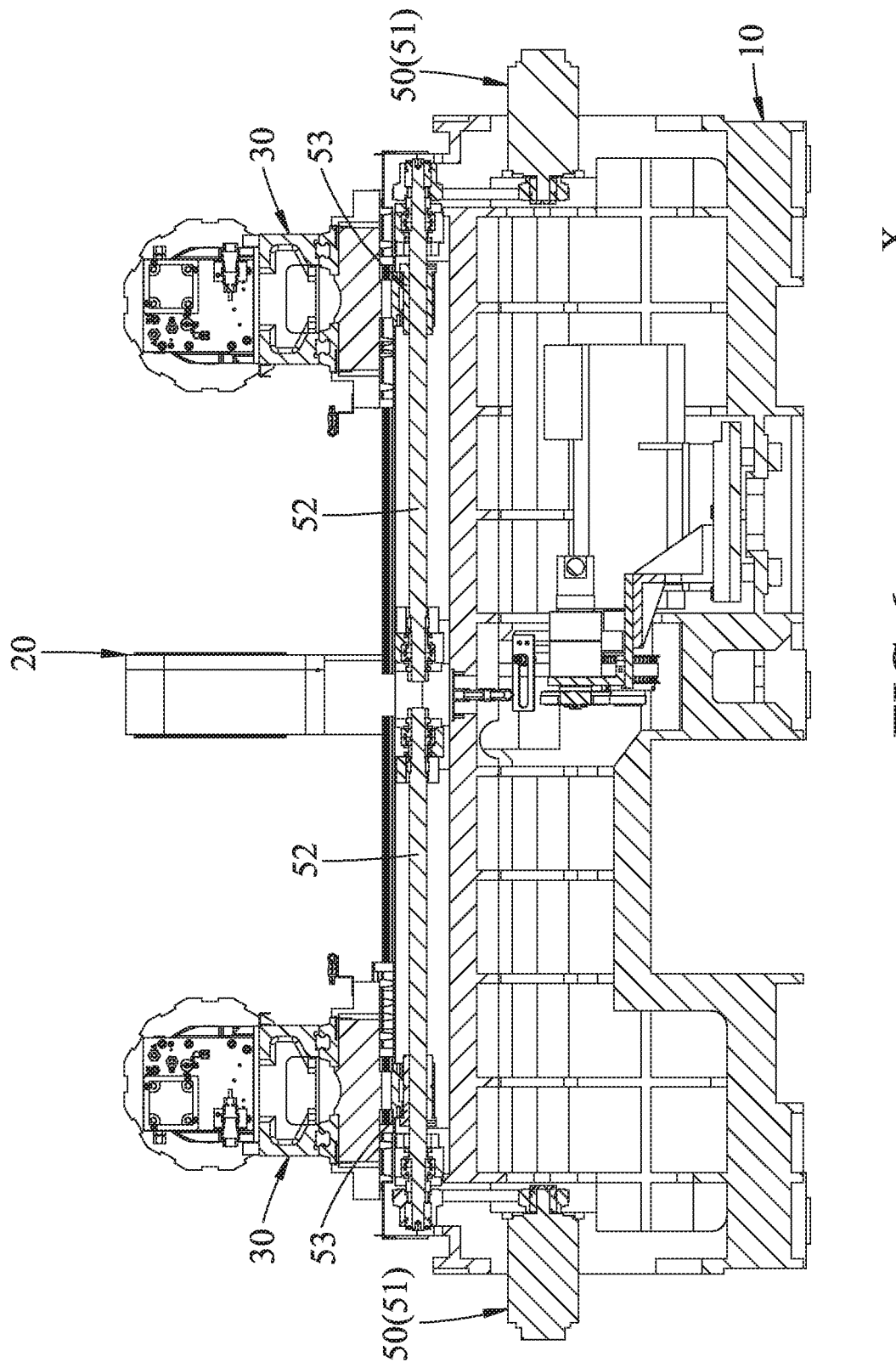
FIG. 6 is a sectional view taken along line VI-VI of FIG. 3.

With reference to FIGS. 4 to 6, each of the X-direction driving units 50 is located between the machine base 10 and the respective tooling turret unit 30, and is disposed to drive a movement of the respective tooling turret unit 30 in the X-direction relative to the machine base 10. In this embodiment, each X-direction driving unit 50 has a drive motor 51 mounted on the machine base 51, a threaded bolt 52 extending along a linear track in the X-direction and driven by the drive motor 51 to rotate about the linear track, and a threaded socket 53 secured on the saddle base 311 and threadedly engaged with the threaded bolt 52 such that rotation of the threaded bolt 52 driven by the drive motor 51 results in a linear movement of the threaded socket 53 and the carriage 312 along the linear track relative to the saddle base 311, and the linear movement of the turret 32 in the X-direction relative to the work spindle unit 20.

The lathe machine operates as follows. The workpiece is chucked on the bi-directional spindle chuck 22 of the work spindle unit 20 and is rotated about the spindle axis. The turrets 32 are driven by the Y-direction driving mechanisms 314 to move in the Y-direction to carry out the cutter engaging and retracting operations to the workpiece, and are driven by the X-direction driving units 50 to move in the X-direction. The turrets 32 are also driven by the turret driving members 33 to rotate about the turret axis (L).

As illustrated, by having the turrets 32 being rotatable about the turret axis (L) and the end surfaces 321 thereof facing forwardly, an operator standing in front of the machine base 10 may easily and quickly approach the turrets 32 for facilitating replacement of the cutting tools on the turrets 32, reducing downtime of the lathe machine, which in turn improves the process efficiency. Moreover, with the turrets 32 being rotatable about the turret axis (L), scraps generated from the workpiece during the cutting machining operation can be deflected and collected by the protective cover unit 40 to prevent from flying off and injuring the operator.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A horizontal lathe machine comprising:
   a machine base having an upper surface and a pair of guide rails which are disposed on said upper surface and extend in an X-direction, said upper surface being bordered by a first side, a second side opposite to said first side in the X-direction, a front side, and a rear side opposite to said front side in a Y-direction that is perpendicular to the X-direction;
   a work spindle unit disposed on said machine base and proximate to said front side, and having a mounting seat which is securely mounted on said machine base, and a bi-directional spindle chuck which is rotatably mounted on said mounting seat about a spindle axis in the X-direction, which is operable to be rotated about the spindle axis relative to said mounting seat, and which has two collet ends opposite to each other along the spindle axis;
   a pair of tooling turret units movably disposed on said machine base in the X-direction direction and respectively proximate to said first and second sides, and located at two opposite sides of said work spindle unit in the X-direction, each of said tooling turret units including a saddle which movably rides on said guide rails, and a turret which is rotatably mounted on said saddle about a turret axis in the Y-direction and which is operable to be rotated about the turret axis relative to said saddle, said turret having an end surface disposed normal to the turret axis and facing forwardly; and
   a pair of X-direction driving units, each located between said machine base and a respective one of said tooling turret units and disposed to drive a movement of the respective one of said tooling turret units in the X-direction relative to said machine base, each of said X-direction driving units having a drive motor mounted on said machine base, a threaded bolt extending along a linear track in the X-direction and driven by said drive motor to rotate about the linear track, and a threaded socket secured on said saddle and threadedly engaged with said threaded bolt.

2. The horizontal lathe machine as claimed in claim 1, wherein said turrets of said tooling turret units are located between said bi-directional spindle chuck and said rear side in terms of the Y-direction.

3. The horizontal lathe machine as claimed in claim 2, wherein said saddle of each of said tooling turret units has a saddle base slidably riding on said guide rails, a carriage disposed on said saddle base, a linear slide rail interposed between said saddle base and said carriage to permit a linear movement of said carriage relative to said saddle base, and a Y-direction driving mechanism disposed between said saddle base and said carriage to drive the linear movement of said carriage in the Y-direction relative to said saddle base, said turret of each of said tooling turret units being mounted on said carriage, said Y-direction driving mechanism having a servomotor mounted on said carriage, a threaded bolt extending along a linear track in the Y-direction and driven by said servomotor to rotate about the linear track, and a threaded nut secured on said saddle base and threadedly engaged with said threaded bolt.

4. The horizontal lathe machine as claimed in claim 1, wherein said machine base has a front platform which is disposed forwardly of said front side, said work spindle unit being disposed on said front platform.

5. The horizontal lathe machine as claimed in claim 1, further comprising a protective cover unit disposed to enclose said machine base, said work spindle unit and said tooling turret units.

\* \* \* \* \*